United States Patent Office 3,335,866
Patented Aug. 15, 1967

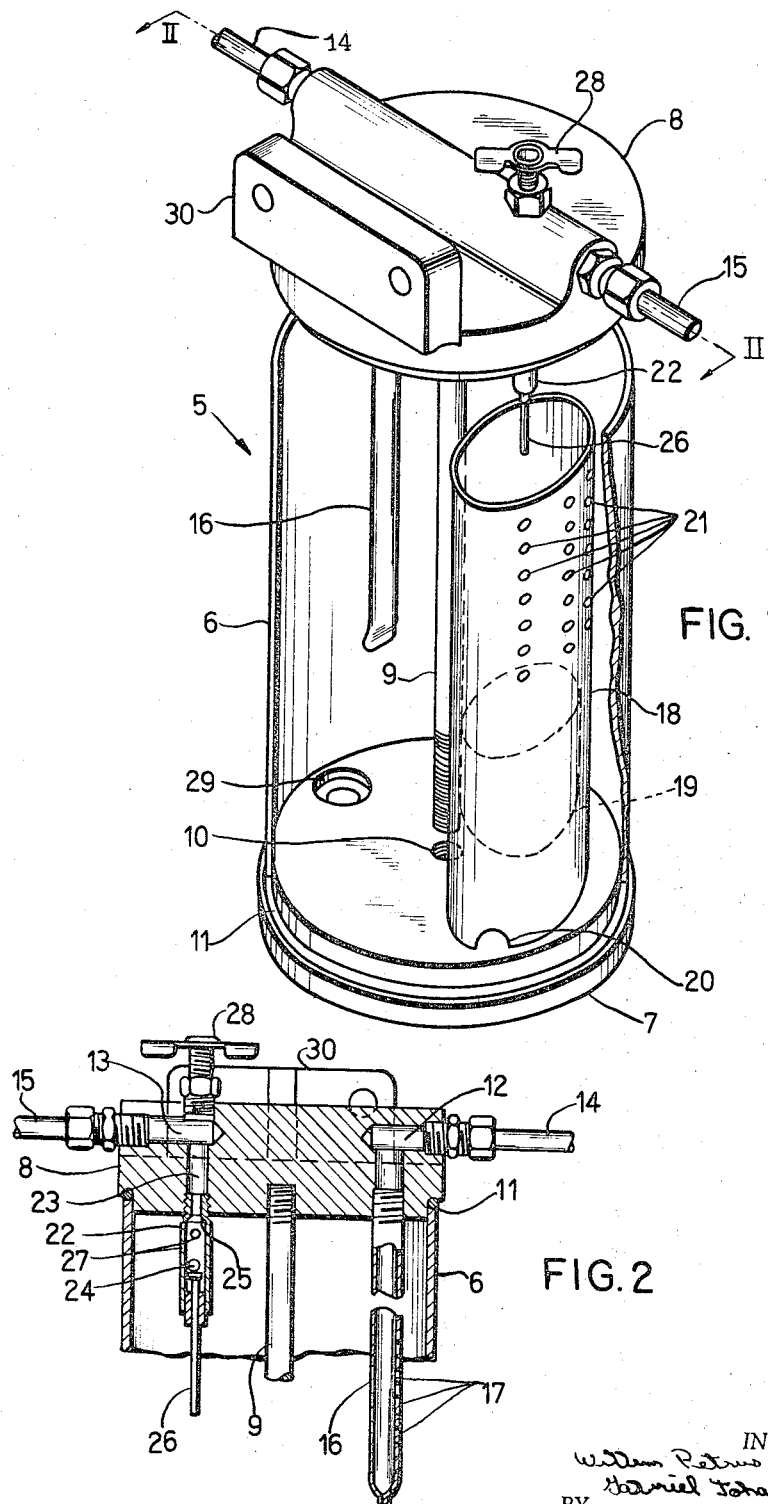

3,335,866
LIQUID SUPPLY LINE TRAP
Willem Petrus Venter, Roedtan, Transvaal, and Gabriël Johannes Greeff, Syferfontein, Enselsberg, Via Zeerust, Transvaal, both of Republic of South Africa
Filed Mar. 16, 1964, Ser. No. 352,119
Claims priority, application Republic of South Africa, Apr. 1, 1963, 63/1,377
1 Claim. (Cl. 210—123)

This invention relates to a device for incorporating in a liquid supply line for trapping a foreign liquid or liquids having a specific gravity greater than that of the supply liquid, and is particularly applicable for use in the fuel supply line of an internal-combustion engine leading fuel to the carburetor or fuel injection pump thereof, for the purpose of trapping water which may be mixed with such fuel supply.

According to the invention, a device for incorporation in a liquid supply line for trapping a foreign liquid or liquids contained in the supply liquid and having a specific gravity greater than that of the supply liquid which comprises, a settling chamber, an inlet and an outlet for the supply liquid connected to the upper region of the settling chamber, a valve chamber connected with the outlet, a valve located in the valve chamber adapted to close the outlet, one or more passages establishing communication between the valve chamber and the upper region of the settling chamber, a valve actuating stem arranged to move the valve upwardly to its closed position and having its lower end projecting downwardly from the valve chamber, and a guided float in the settling chamber having a specific gravity less than the foreign liquid or liquids to be trapped and greater than that of the supply liquid, the arrangement being such that when a predetermined quantity of such foreign liquid or liquids has settled in the lower region of the settling chamber, the float will be raised to make contact with the lower end of the valve actuating stem and thereby to move the valve to its closed position.

The passage or passages establishing communication between the valve chamber and the upper region of the settling chamber is or are arranged to enter the valve chamber in such a manner that inflowing supply liquid will not normally tend to move the valve towards its closed position. Preferably therefore the entry point or points thereof is or are disposed above the valve when it is in its lower or open position in the bottom end of the valve chamber.

The float is freely located for vertical movement within a vertical tubular guide member extending between the bottom end and top end of the settling chamber, which guide member is arranged to be vertically in line below the valve chamber and the valve-actuating stem, and is provided with apertures in the walls thereof to permit the trapped liquid or liquids to enter the bore thereof for float raising purposes.

The valve and the valve-actuating stem are separate elements and the valve is preferably a ball valve coacting with a valve seating in the top end of the valve chamber, and the valve-actuating stem is slidably guided in the bottom end of the valve chamber with its lower end protruding therefrom.

The inlet for the supply liquid is provided with an extension which projects downwardly into the settling chamber, and at its lower end is provided with lateral outlet openings directed towards the vertical wall of the settling chamber and in a direction away from the supply liquid outlet.

This downwardly projecting extension of the inlet fulfills an important function in that it directs the incoming liquid supply towards a comparatively quiescent region of the body of liquid in the settling chamber where small globules of a foreign liquid which may be entrained in the supply liquid, are prevented from being carried towards the outlet and instead tend to sink to the bottom of the settling chamber. This has been found to be particularly effective where the supply liquid is diesel fuel for an internal-combustion engine and the foreign liquid is water. Without the provision of this downward extension of the inlet, very small globules of water are capable of being carried across to the outlet before they have time to sink to a lower level and thereby escape from the current of supply liquid moving from the inlet to the outlet across the upper region of the body of liquid in the settling chamber. The downwardly projecting extension may terminate adjacent to the bottom of the settling chamber.

A drain cock is provided at the bottom end of the settling chamber to draw-off the trapped liquid or liquids as required.

The bottom end of the float is preferably of rounded form to facilitate its release from the bottom of the float guide chamber, when foreign liquid tends to lift it, more particularly if a layer of sludge may have become deposited on the bottom of the float chamber or due to surface tension.

An air inlet or release cock is provided at the top end of the settling chamber to admit air to facilitate the emptying operation.

The top end of the settling chamber is constituted by a removable cover, in which inlet and outlet openings for the supply liquid are provided, and wherein the valve chamber is fixed to or formed on the underside thereof.

To enable the invention to be more clearly understood and carried into practice, reference is now made to the accompanying drawings in which:

FIGURE 1 is a pictorial exploded part-cut-away view of a device constructed according to the invention, and FIGURE 2 is a fragmentary part-sectional view of the top of the device of FIGURE 1, taken on line II—II of FIGURE 1 and showing the cover in its closed position.

Referring to the drawings, reference 5 denotes the settling chamber generally which is constituted by a tubular body member 6 and a base member 7, with the top end of the body member 6 being closed by a top cover 8. A screw-threaded stud 9, fixed to the underside of the cover 8, is arranged for its bottom end to pass through an aperture 10 in the base member 7, and a nut engaging with this end, in conjunction with a sealing washer, enables the three parts to be clamped together in a liquid-tight manner by the provision of top and bottom sealing rings 11.

Provided in one side of the cover 8 is a supply liquid inlet recess 12 and on the opposite side with a supply liquid outlet recess 13, connected in known manner to the inlet and outlet pipes 14 and 15 respectively.

The inlet recess 12 is also connected to a downwardly extending feed pipe 16 provided with apertures 17 on its side facing the settling chamber wall and closed as regards its bottom end.

Arranged diametrically opposite the feed pipe 16 is the tubular guide member 18 for locating the float 19, which may be made from a suitable synthetic resin material, and has a flat top. Both the guide member 18 and the float 19 are preferably of elliptical or circular shape in cross-section, and the guide member 18 is located close to the wall of the settling chamber and is provided with at least one aperture 20 at its bottom end and with a plurality of apertures 21 at its upper end directed towards the settling chamber wall.

The valve chamber 22 is arranged to be screw-threadedly connected in a bore 23 communicating with the outlet recess 13. Freely movable within the bore of the valve chamber 22 is a ball valve 24, which is arranged to seat on the valve seating 25 which raised by the valve stem 26, which is slidably located in the bottom end of the valve chamber and is provided with a head at its top end to act as stop means.

Apertures 27 are provided in the wall of the valve chamber to permit the supply liquid to flow into the outlet pipe 15 when the ball valve is in its open position as shown in FIGURE 2.

Connected to the outlet recess 13 is an air inlet stop cock 28 of known construction and a similar drain stop cock is located in a drain outlet aperture 29 in the base member 7. The stop cock 28 is opened to admit air to the settling chamber to facilitate the draining operation by way of the drain cock.

The top cover 8 is provided with a holed flange 30 by means of which the device can be bolted to suitable supporting means.

When the invention is incorporated in the fuel line of an internal-combustion engine, such as that of a tractor, for the purpose of trapping water mixed with fuel, the closing of the valve will starve the engine of fuel and cause it to stop. Restarting of the engine will not be possible until the trapped water has been run out by way of the drain cock.

The valve 24 and its actuating stem 26 are made as small and as light as possible having regard to the rate of flow of fuel required to be delivered to the engine, so that a most important feature of the whole device is that the float 19 will only have to lift the valve actuating stem and valve a certain distance whereafter the suction or pressure of the flowing liquid fuel in the fuel line will lift the valve further to a closed position and keep it there independently of the float and it will remain closed notwithstanding jolting, to which it may be subjected, tending to unseat it.

We claim:

A liquid trapping device for incorporating in a liquid supply line for trapping a foreign liquid or liquids contained in the supply liquid and having a specific gravity greater than that of the supply liquid, comprising a settling chamber, a top cover for said chamber having an inlet and an outlet to said chamber for the supply liquid communicating with the underside of said top cover at laterally spaced positions, a valve chamber connected to said outlet extending downwardly from the underside of said top cover and having a bottom opening, a valve located in said valve chamber adapted to close said outlet, a passage in said valve chamber establishing communication between said valve chamber and the upper region of said settling chamber, a relatively short valve actuating stem having its lower end projecting through and slidably guided in said bottom opening, a guided float in said settling chamber having a specific gravity less than that of a foreign liquid to be trapped and greater than that of the supply liquid, located directly below and arranged to engage with the lower end of said stem to close said valve, and a feed pipe extension connected to said inlet projecting downwardly from the underside of said top cover into said settling chamber, said feed pipe extension having at its lower end lateral outlet openings directed towards a vertical wall of said settling chamber in a direction away from said supply liquid outlet whereby the separation of globules of a foreign liquid from the supply liquid is facilitated so that when a predetermined quantity of foreign liquid has settled in the lower region of said settling chamber said float will raise said valve-actuating stem to move said valve to closed position.

References Cited
UNITED STATES PATENTS

| 924,524 | 6/1909 | Zerkowitz | 210—123 |
| 2,170,247 | 8/1939 | Lambert | 210—540 X |
| 2,844,254 | 7/1958 | Ansley | 210—123 X |
| 3,012,675 | 12/1961 | Phelps et al. | 210—123 X |

FOREIGN PATENTS

| 547,667 | 9/1922 | France. |
| 88,116 | 5/1958 | Holland. |

REUBEN FRIEDMAN, *Primary Examiner.*

SAMIH N. ZAHARNA, *Examiner.*

C. M. DITLOW, *Assistant Examiner.*